US010939151B1

(12) United States Patent
Lee et al.

(10) Patent No.: US 10,939,151 B1
(45) Date of Patent: Mar. 2, 2021

(54) HEAD-END SYSTEM FOR TERRESTRIAL BROADCAST BASED ON VIRTUALIZED BROADCAST FRAME WORK

(71) Applicant: MARUENG CO., LTD., Daejeon (KR)

(72) Inventors: Woo Chul Lee, Daejeon (KR); Dong Hyun Kwon, Daejeon (KR); Hee Lin Park, Daejeon (KR)

(73) Assignee: MARUENG CO., LTD., Daejeon (KR)

( * ) Notice: Subject to any disclaimer, the term of this patent is extended or adjusted under 35 U.S.C. 154(b) by 0 days.

(21) Appl. No.: 17/004,004

(22) Filed: Aug. 27, 2020

(30) Foreign Application Priority Data

Dec. 6, 2019  (KR) .......................... 10-2019-0161985

(51) Int. Cl.
| | | |
|---|---|---|
| H04N 7/173 | (2011.01) | |
| H04N 21/262 | (2011.01) | |
| H04N 21/61 | (2011.01) | |
| H04N 21/443 | (2011.01) | |
| H04N 21/6405 | (2011.01) | |
| H04N 21/24 | (2011.01) | |

(52) U.S. Cl.
CPC ....... *H04N 21/262* (2013.01); *H04N 21/2402* (2013.01); *H04N 21/443* (2013.01); *H04N 21/6112* (2013.01); *H04N 21/6405* (2013.01)

(58) Field of Classification Search
CPC ......... H04N 21/64322; H04N 21/2381; H04N 1/00244; H04N 21/2383; H04N 21/2385; H04N 21/26216; H04N 21/2665; H04N 2121/2343
See application file for complete search history.

(56) References Cited

U.S. PATENT DOCUMENTS

| | | | | |
|---|---|---|---|---|
| 2012/0088584 A1* | 4/2012 | Mamtani | ............... | A63F 13/355 463/42 |
| 2017/0295409 A1* | 10/2017 | Simon | ..................... | H04L 29/06 |
| 2019/0268777 A1* | 8/2019 | Simon | ..................... | H04W 4/06 |
| 2020/0169344 A1* | 5/2020 | Clift | ........................ | H04H 60/15 |
| 2020/0288325 A1* | 9/2020 | Simon | ................... | H04W 76/40 |

FOREIGN PATENT DOCUMENTS

KR  10-1502228 B1  3/2015

OTHER PUBLICATIONS

Full Translation of WO 2015034225 A1, Mar. 12, 2015, WIPO PCT (Year: 2015).*

* cited by examiner

*Primary Examiner* — Jason Salce
(74) *Attorney, Agent, or Firm* — Revolution IP, PLLC

(57) ABSTRACT

A head-end system for terrestrial broadcast based on a virtualized broadcast framework includes a media configured to store a broadcast head-end virtualized component (BHVC) corresponding to all pieces of software related to a head-end device for transmission of ATSC 3.0 terrestrial broadcast, a plurality of worker nodes configured to transfer data to an exciter of a transmitting station by installing the BHVC stored in the media and performing a function of a typical head-end, and a mater node configured to monitor the plurality of worker nodes while storing and managing a container for installing the BHVC stored in the media in the worker nodes, and thus, modularizes a series of functions related to broadcast transmission in software units and effectively provides a broadcast service in a public or private cloud environment with departing from a broadcast device based on hardware or dedicated software.

5 Claims, 6 Drawing Sheets

[FIG.1]
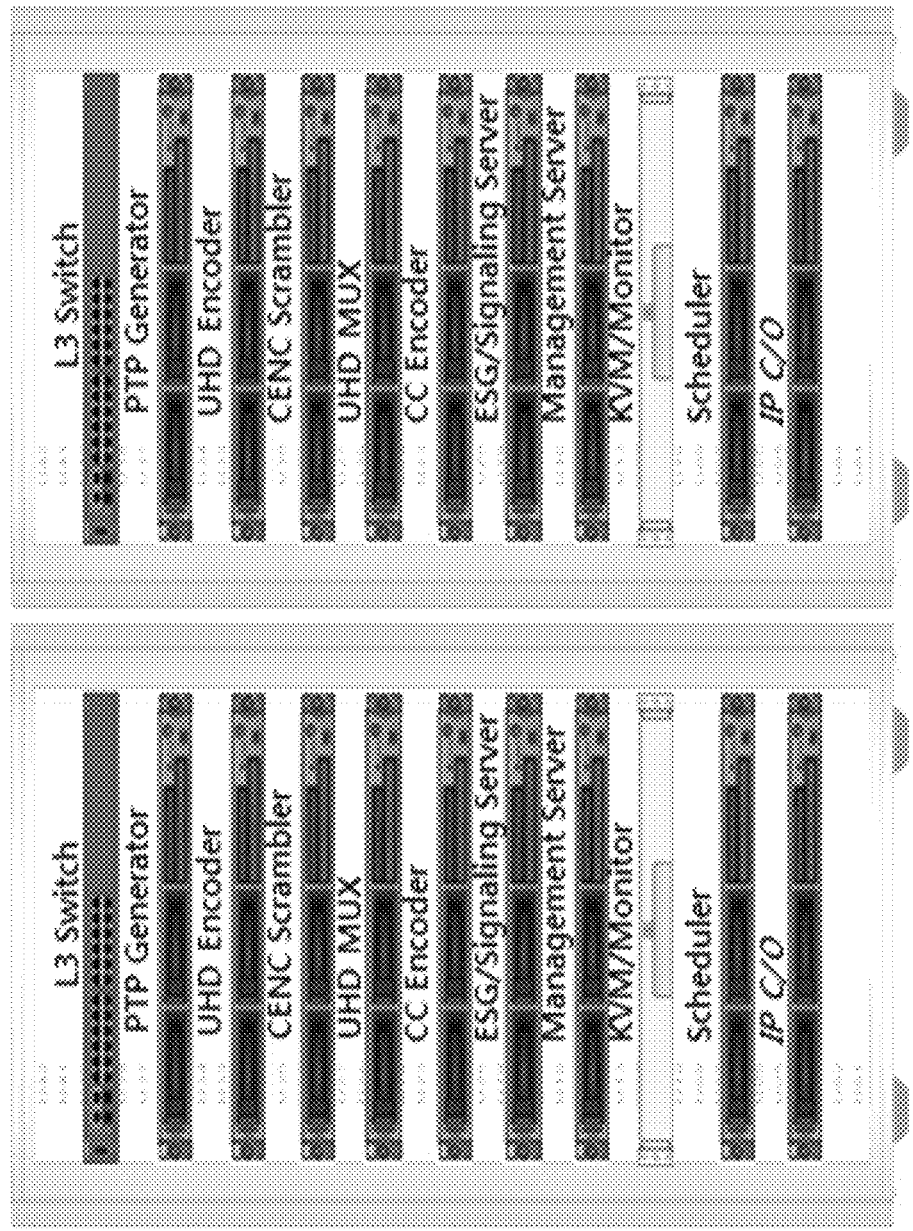

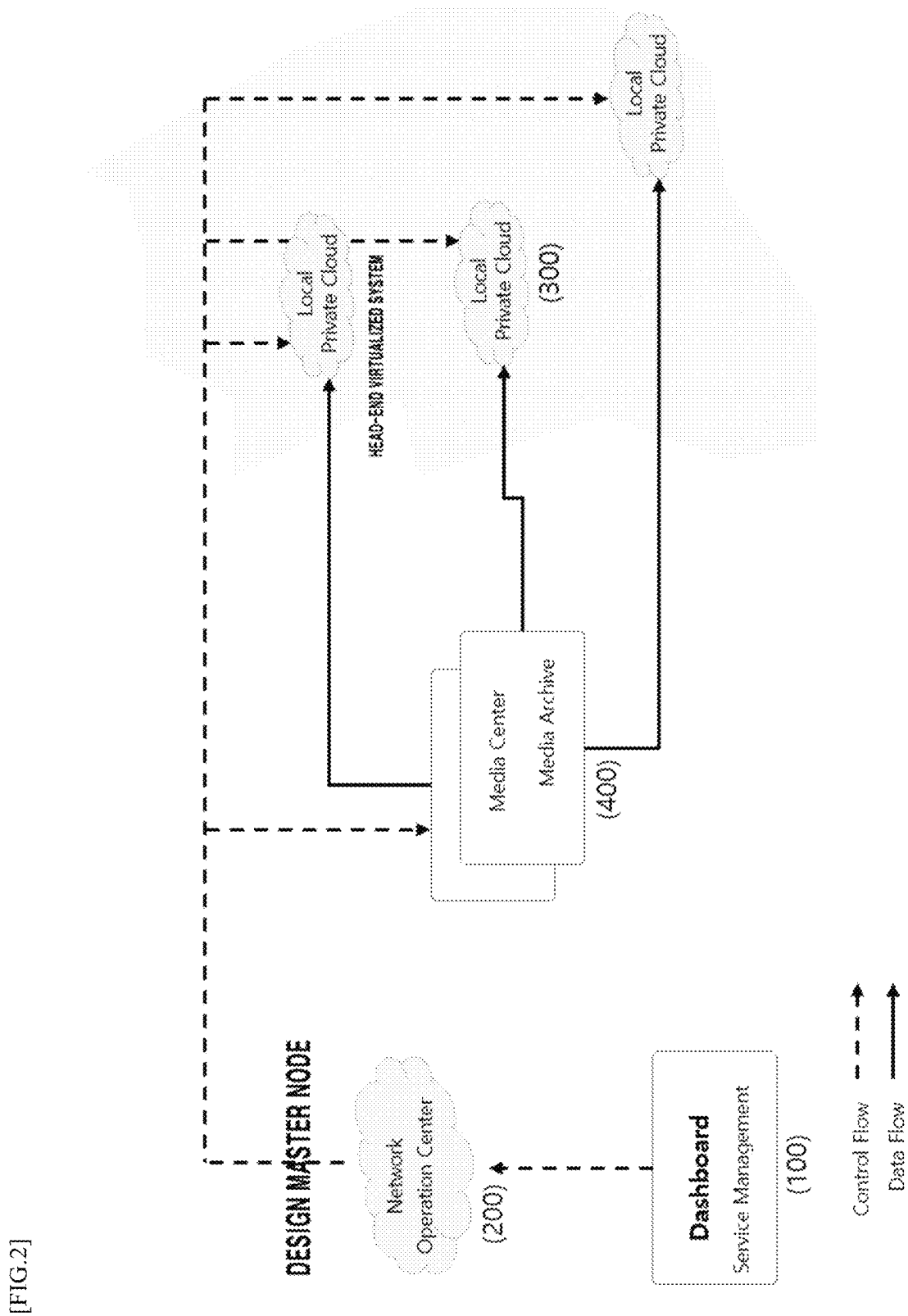
[FIG.2]

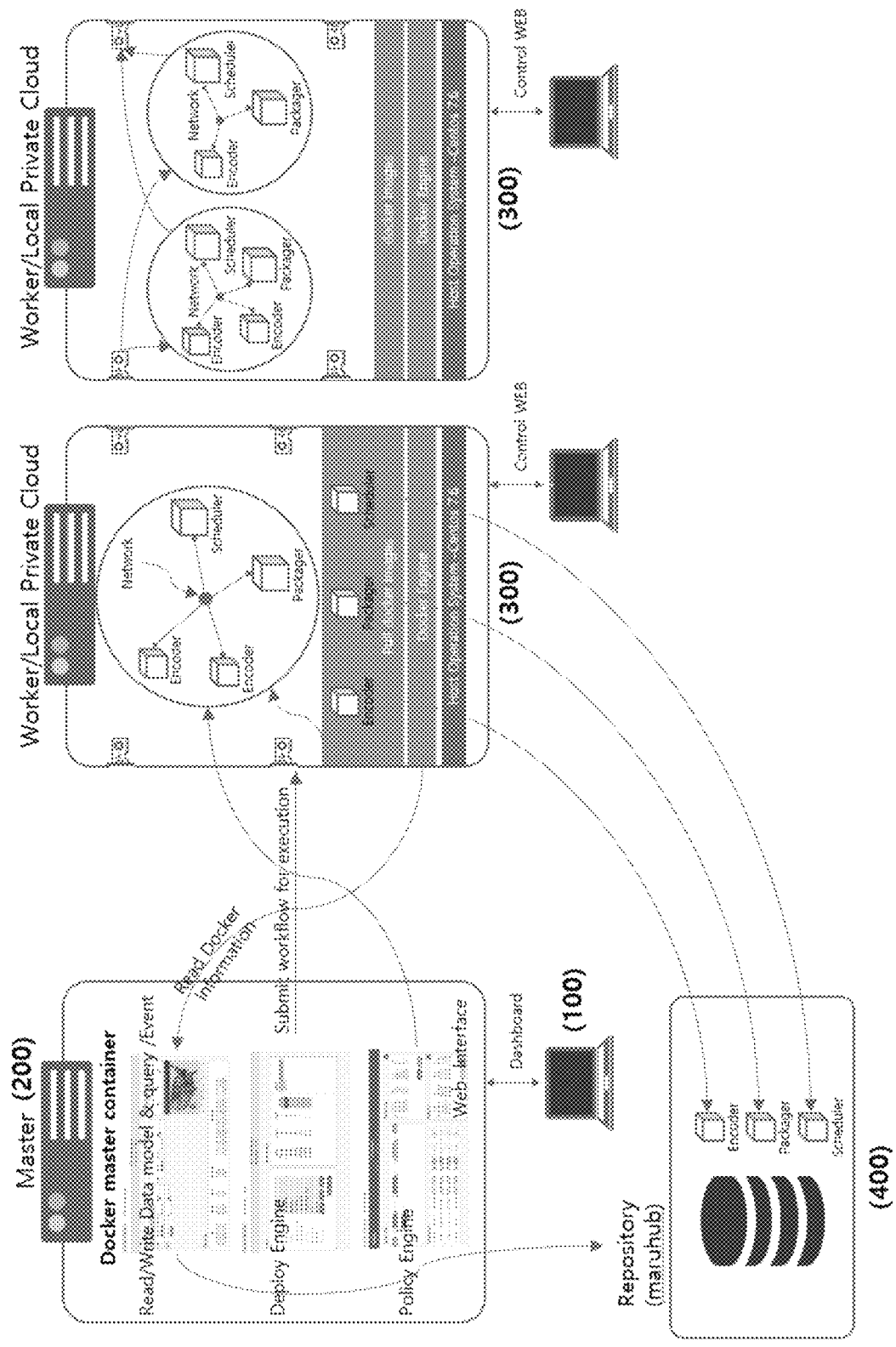
[FIG.3]

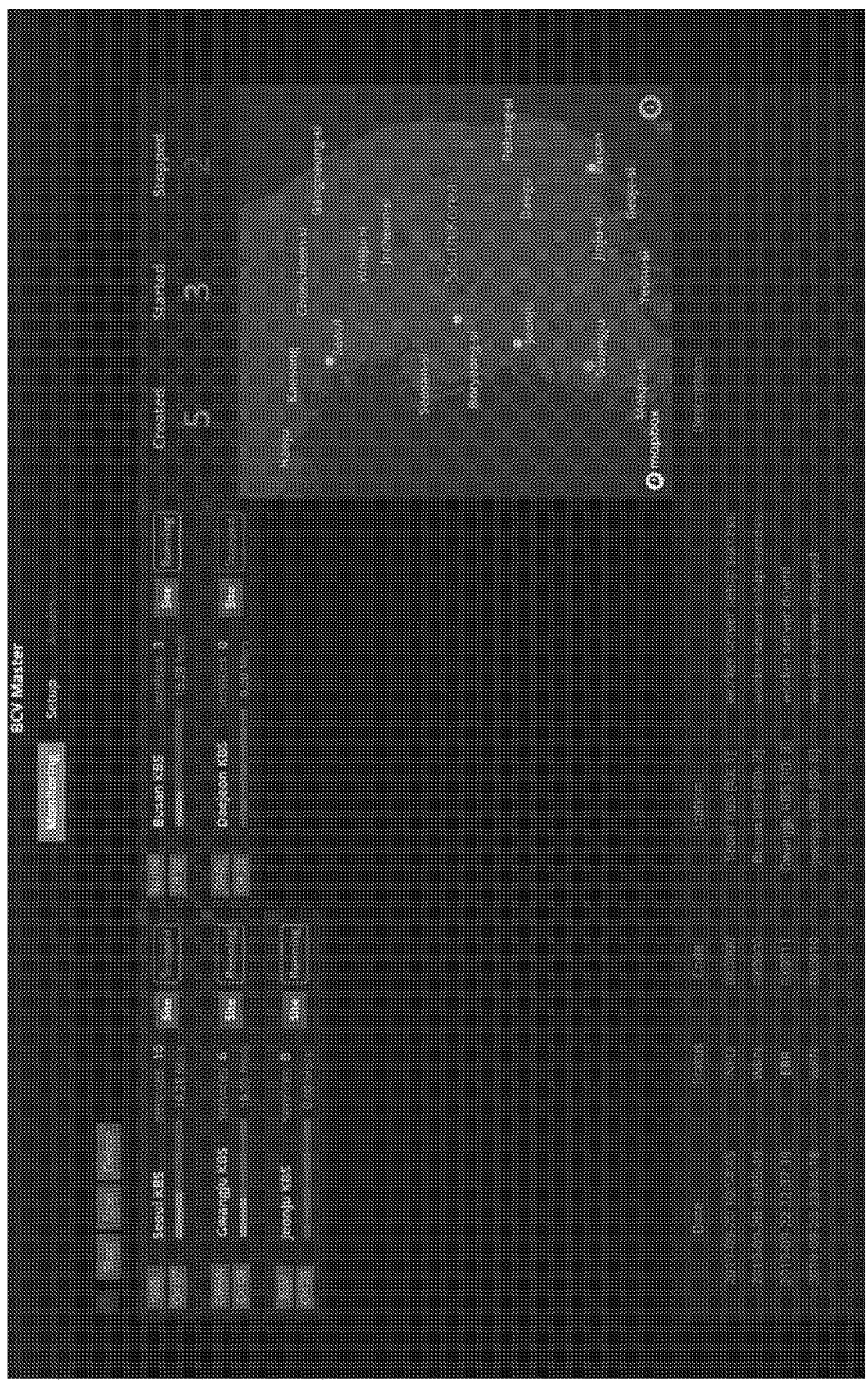
[FIG.4]

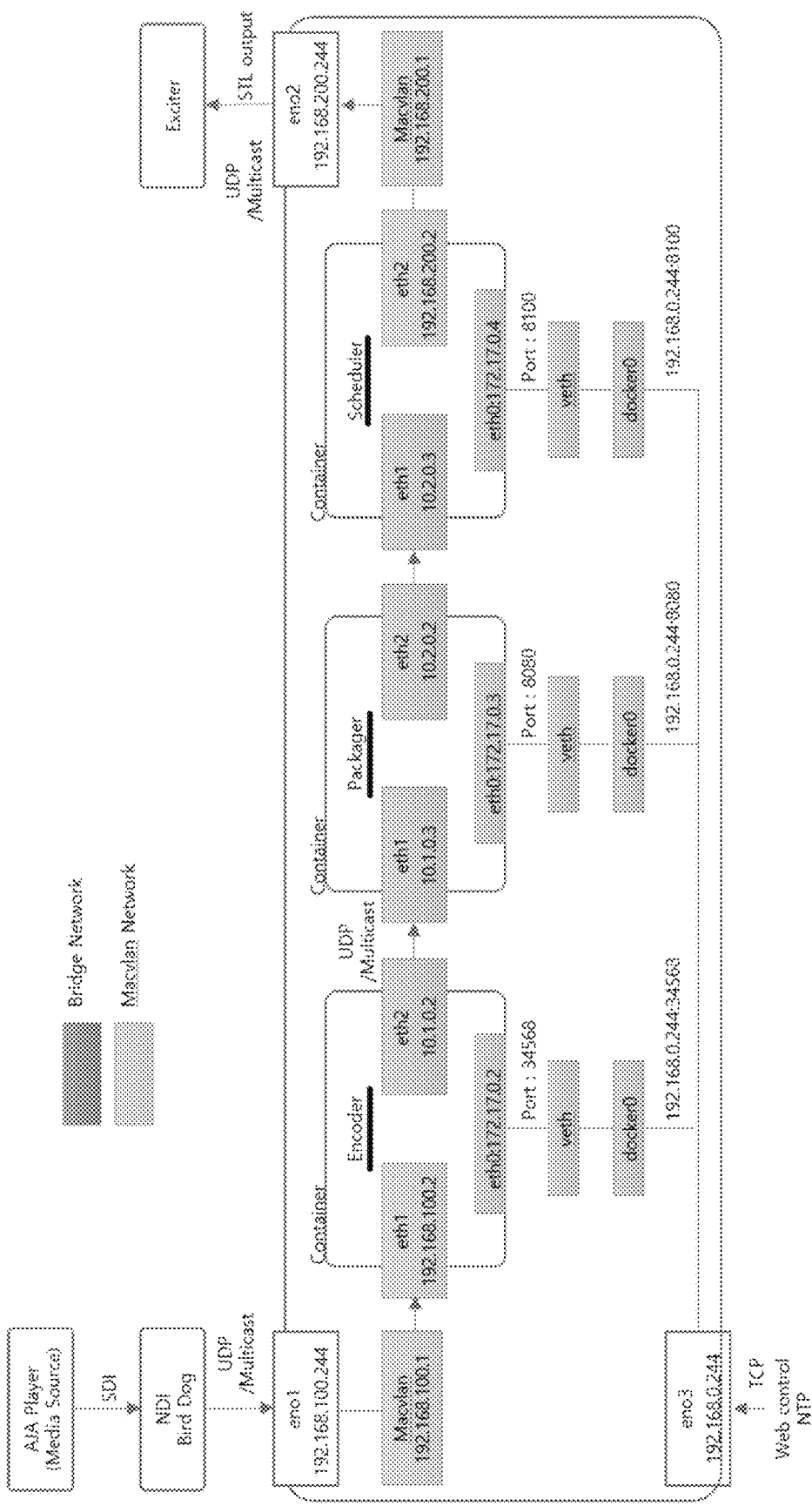
[FIG.5]

[FIG.6]
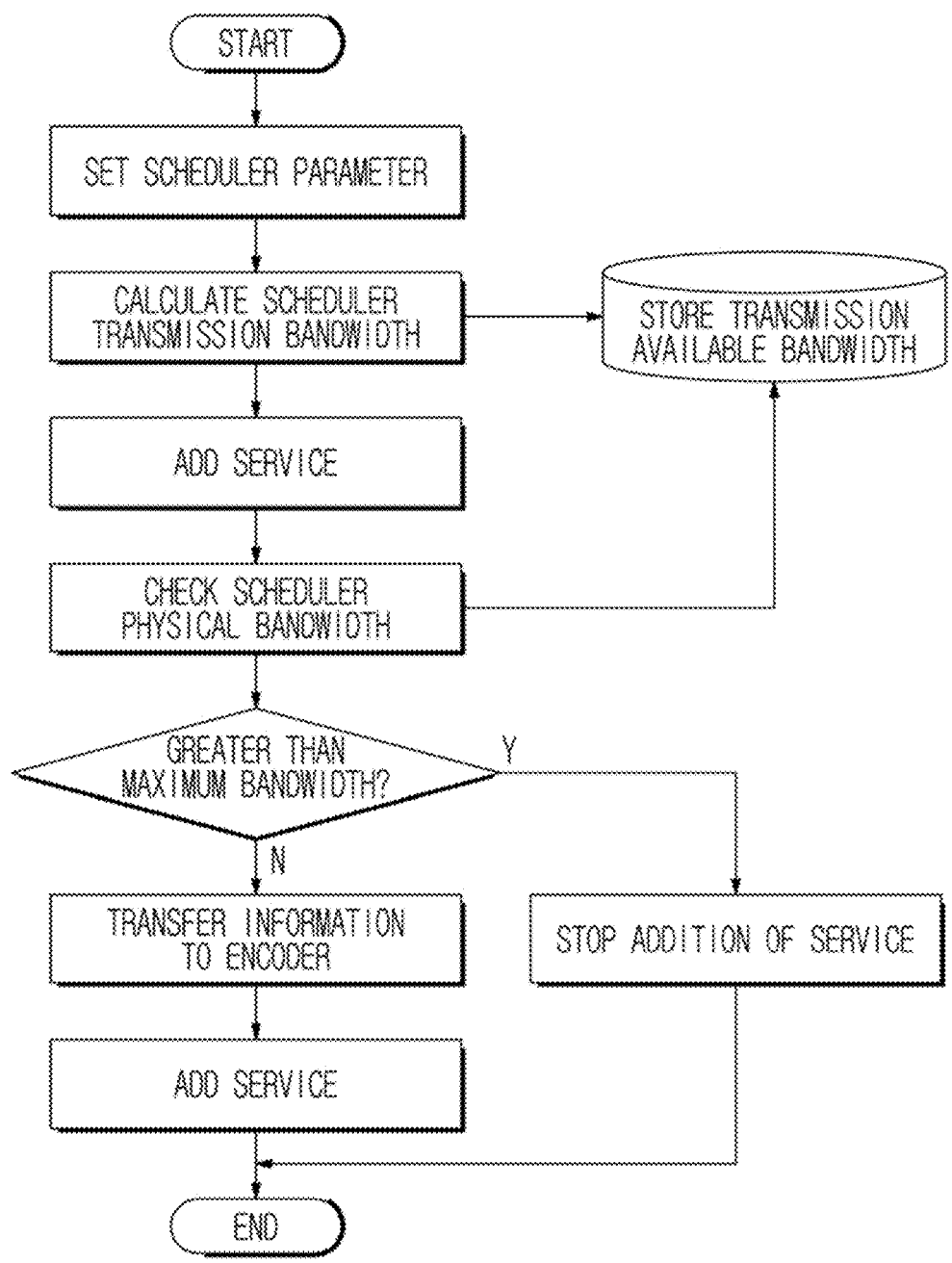

HEAD-END SYSTEM FOR TERRESTRIAL BROADCAST BASED ON VIRTUALIZED BROADCAST FRAME WORK

CROSS-REFERENCE TO THE RELATED APPLICATION

This application claims priority from Korean Patent Application No. 10-2019-0161985, filed on Dec. 6, 2019, in the Korean Intellectual Property Office, the disclosure of which is incorporated herein by reference in its entirety.

BACKGROUND OF THE INVENTION

Field of the Invention

The present disclosure relates to a head-end system for terrestrial broadcast based on a virtualized broadcast framework, and more particularly, to a head-end system for terrestrial broadcast based on a virtualized broadcast framework for modularizing a series of functions required to transmit media data that is completely produced, edited, and organized and providing a broadcast service in a public or private cloud environment with departing from a broadcast device based on hardware or dedicated software.

Description of the Related Art

An ATSC 3.0 broadcast head-end system is configured with hardware such as an L3 Switch, a PTP Generator, an UHD encoder, a CENC scrambler, a UHD MUX, an CC encoder, an ESG/signaling server, a management server, a KVM/monitor, a scheduler, and IP C/O for actual broadcast to media through production and organization, as shown in FIG. 1.

Each system is manufactured and installed through a separate server or dedicated hardware equipment, and in South Korea, has been used to transmit UHD broadcast from late 2017.

As such, a broadcast head-end system developed according to the conventional art has a problem in that separately configured system chains are each installed to increase complexity and much effort and time are required in a matching process between heterogeneous devices.

In addition, there is a problem in that temporal and monetary costs are consumed in terms of maintenance for broadcast management.

CITED REFERENCE

Patent Document (Patent Document 0001) Korean Patent No. 10-1502228 (Mar. 6, 2015)

SUMMARY OF THE INVENTION

Therefore, the present disclosure has been made in view of the above problems, and it is an object of the present disclosure to provide a head-end system for terrestrial broadcast based on a virtualized broadcast framework for installing separately embodied functions by virtualizing the whole head-end chain.

In addition, it is another object of the present disclosure is to provide a head-end system for terrestrial broadcast based on a virtualized broadcast framework for configuring head-end devices (encoder/multiplexer/signaling/gateway) for transmission of ATSC 3.0 terrestrial broadcast in the form of software and automatically generating, deleting, and updating a broadcast transmitting service (UHDTV or multichannel) in a cloud computing virtualization resource (virtual machine) environment.

In accordance with an aspect of the present disclosure, the above and other objects can be accomplished by the provision of a head-end system for terrestrial broadcast based on a virtualized broadcast framework, including a media configured to store a broadcast head-end virtualized component (BHVC) corresponding to all pieces of software related to a head-end device for transmission of ATSC 3.0 terrestrial broadcast, a plurality of worker nodes configured to transfer data to an exciter of a transmitting station by installing the BHVC stored in the media and performing a function of a typical head-end, and a mater node configured to monitor the plurality of worker nodes while storing and managing a container for installing the BHVC stored in the media in the worker nodes.

The master node of the head-end system for terrestrial broadcast based on a virtualized broadcast framework may store the container for installing the BHVC and may automatically update a head-end component to the worker node when the head-end component is changed.

The worker node of the head-end system for terrestrial broadcast based on a virtualized broadcast framework may establish a plurality of stations by configuring one or plural physical servers, installing a docker, obtaining a plurality of pieces of software related to a broadcast head-end device from the master node, and configuring a transmission chain in each worker node on the docker.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram showing a configuration of a conventional hardware-based broadcast device;

FIG. 2 is a diagram showing a head-end system for terrestrial broadcast based on a virtualized broadcast framework according to the present disclosure;

FIG. 3 is a detailed diagram showing a head-end system for terrestrial broadcast based on a virtualized broadcast framework according to the present disclosure;

FIG. 4 is a diagram showing a monitoring image of a head-end system for terrestrial broadcast based on a virtualized broadcast framework according to the present disclosure;

FIG. 5 is a diagram showing a detailed configuration of ATSC 3.0 embodied in virtualized software installed in a worker node of a head-end system for terrestrial broadcast based on a virtualized broadcast framework according to the present disclosure; and FIG. 6 is a diagram for explaining automatic setting of a service depending on whether a transmission bandwidth is greater than a maximum bandwidth in a head-end system for terrestrial broadcast based on a virtualized broadcast framework according to the present disclosure.

DETAILED DESCRIPTION OF THE INVENTION

Terms or words used in the specification and claims shall not be limited to having common or dictionary meanings, and have the meanings corresponding to technical aspects of the embodiments of the present disclosure so as to most suitably express the embodiments of the present disclosure Thus, embodiments described in the specification and components shown in the drawings are a merely exemplary embodiment of the present disclosure and do not represent all technological features of the present disclosure, and thus, it is to be appreciated that various equivalents and modifications can be made to substitute the features when the application is filed.

Hereinafter, a head-end system for terrestrial broadcast based on a virtualized broadcast framework according to the present disclosure will be described with reference to the accompanying drawings.

Referring to FIG. 2, the head-end system for terrestrial broadcast based on a virtualized broadcast framework according to the present disclosure may include a dashboard 100, a master node (network operation center) 200, a worker node (local private cloud) 300, and a repository (media center) 400.

The dashboard 100 may correspond to a user terminal that performs a user interface (UI) function of head-centrally monitoring and managing a virtualized system present condition of a whole broadcast station on the web based on various pieces of information on a single screen.

In more detail, the dashboard 100 may monitor a service state of an ATSC 3.0 broadcast head-end chain generated for worker nodes positioned in respective areas through a map installed in the dashboard 10, may perform a notification function when a problem occurs, and may provide a rapid contact channel with a person in charge.

In particular, the dashboard 100 may easily provide information appropriate for decision making and working analysis and manage a user and a group, and may be supportable in any mobile or fixed type device that is capable of using a portable PC and a web browser.

The other components, that is, the master node 200, the worker node 300, and the media 400 will be described in more detail with reference to FIG. 3.

As shown in FIG. 2, the master node 200 may perform control to provide virtualized software of head-end devices (encoder/multiplexer/signaling/gateway) for transmission of ATSC 3.0 terrestrial broadcast to the worker node 300, to the media 400, according to a control signal input from the dashboard 100.

The media 400 may provide data stored therein to the worker node 300 under control of the master node 200.

The master node 200 may perform control to execute the virtualized software provided to the worker node 300.

As shown in FIG. 3, the master node 200 may also be referred to as a master and may store and manage a container for installing a broadcast head-end virtualized component (BHVC) in the worker node 300.

In this case, the master node 200 may store the container for installing the broadcast head-end virtualized component (BHVC) and may automatically update a head-end virtualized component to the worker node 300 when the head-end virtualized component is changed.

In particular, the master node 200 may monitor whether head-end devices for transmitting virtualized ATSC 3.0 terrestrial broadcast provided to the worker node 300 from the media 400 are appropriately installed and normally operated and may manage the head-end devices.

The master node 200 may monitor whether software data of encoder, packager, and scheduler devices among the virtualized head-end devices for transmission of ATSC 3.0 terrestrial broadcast provided to the worker node 300 from the media 400 is appropriately installed and normally operated in the worker node 300 and may manage the software data.

For example, the worker node 300 may correspond to a plurality of worker nodes, for example, a worker node in Seoul, a worker node in Daejeon, or a worker in Busan, the master node 200 may monitor whether virtualized software of a head-end device for simultaneous transmission of ATSC 3.0 terrestrial broadcast to the plurality of worker nodes 300 is appropriately installed in the worker node 300 and may manage the software data through a screen shown in FIG. 4.

That is, in the head-end system for terrestrial broadcast based on a virtualized broadcast framework according to the present disclosure, when the media 400 provides virtualized software data of the head-end device for transmission of ATSC 3.0 terrestrial broadcast to the worker node 300, the master node 200 may easily monitor whether the worker node 300 is normally operated by indicating red when a problem occurs, indicating green when there is no problem, and indicating orange color in a dangerous situation in which a problem is predicted to occur, as shown in FIG. 4, and thus, may guide rapid examination of a manager.

The worker node 300 may perform a conventional broadcast equipment function using a virtualized system including all broadcast head-end system functions corresponding to typical hardware.

That is, the worker node 300 may receive virtualized software data of a head-end device from the media 400, may function as a typical head-end system, and may transfer broadcast data to an exciter of a transmitting station.

The media 400 may store any software related to a head-end device for transmitting ATSC 3.0 terrestrial broadcast and may provide the software to the worker node 300 under the master node 200.

A terminal 500 for operating the worker node may be connected to the worker node 300, and thus, an operator may control the worker node on the web.

The worker node 300 may include a docker network therein, a detailed configuration of which is shown in FIG. 5.

As shown in FIG. 5, the docker master node may store an encoder, a packager, and a scheduler in independent containers, respectively, may configure a single or more head-end chains in the worker node, and may automatically arrange software application programs and may execute the programs in the form of an image.

In this case, the worker node 300 may automatically connect multicast addresses of the encoder, the packager, and the scheduler to reduce installation error.

That is, the worker node 300 may install a head-end module by generating an internal virtual switch of a docker and automatically allocating and connecting the multicast addresses between the internal containers, as shown in FIG. 5.

A maximum setting available value of a service may be automatically set depending on an allocated physical bandwidth.

In more detail, as shown in FIG. 6, the worker node 300 may set scheduler parameters of all pieces of software related to the head-end device for transmitting ATSC 3.0 terrestrial broadcast and may calculate a corresponding scheduler transmission bandwidth.

In this case, the worker node 300 may transmit the calculated scheduler transmission bandwidth and may store the same in a database.

Then, the worker node 300 may add a broadcast service to the calculated scheduler transmission bandwidth, may check a physical bandwidth of a scheduler, and may determine whether the physical bandwidth is greater than a maximum bandwidth.

Then, when the physical bandwidth is greater than the maximum bandwidth, the worker node 300 may stop addition of the broadcast service, and in contrast, when the physical bandwidth is not greater than the maximum bandwidth, the worker node 300 may transmit information indicating that the physical bandwidth is not greater than the maximum bandwidth, to an encoder and may add the broadcast service, and thus, may automatically set the maximum setting available value of the service depending on an allocated physical bandwidth.

With regard to the Daejeon KBS broadcasting station, when two broadcast channels, KBS 1 and KBS 2 are present therein, and thus, two stations may be formed by establishing the two worker nodes 300.

Based on the above description, the head-end system for terrestrial broadcast based on a virtualized broadcast framework according to the present disclosure may establish a plurality of stations in one worker node 300. In general, the worker node may simultaneously operate main/backup systems for safety of broadcast transmission.

To this end, the worker node may establish a plurality of stations by configuring the one or plural physical servers 300, installing a docker, obtaining a plurality of pieces of software related to a broadcast head-end device from the master node, and configuring a transmission chain in each worker node on the docker.

The head-end system for terrestrial broadcast based on a virtualized broadcast framework according to the present disclosure may have enhanced flexibility compared with a conventional chain system including an independent module, may maximize system efficiency through allocation/reallocation of computing resources, may enhanced efficiency of operation and management, and may rapidly apply (addition/deletion of channels) a new service, and as a result, may provide enhanced quality of service (QoS)/quality of experience (QoE) to a user.

The head-end system for terrestrial broadcast based on a virtualized broadcast framework according to the present disclosure may modularize a series of functions related to broadcast transmission in software units and may effectively provide a broadcast service in a cloud environment with departing from a broadcast device based on hardware or dedicated software.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A head-end system for terrestrial broadcast based on a virtualized broadcast framework, comprising:
   a media configured to store a broadcast head-end virtualized component (BHVC) corresponding to all pieces of software related to a head-end device for transmission of ATSC 3.0 terrestrial broadcast;
   a plurality of worker nodes configured to transfer data to an exciter of a transmitting station by installing the BHVC stored in the media and performing a function of a typical head-end; and
   a mater node configured to monitor the plurality of worker nodes while storing and managing a container for installing the BHVC stored in the media in the worker nodes.

2. The head-end system for terrestrial broadcast based on a virtualized broadcast framework of claim 1, wherein the master node stores the container for installing the BHVC and automatically updates a head-end component to the worker node when the head-end component is changed.

3. The head-end system for terrestrial broadcast based on a virtualized broadcast framework of claim 2, wherein the worker node installs a head-end module by generating an internal virtual switch of a docker and automatically allocating and connecting multicast addresses of internal containers.

4. The head-end system for terrestrial broadcast based on a virtualized broadcast framework of claim 3, wherein the worker node establishes a plurality of stations by configuring one or plural physical servers, installing a docker, obtaining a plurality of pieces of software related to a broadcast head-end device from the master node, and configuring a transmission chain in each worker node on the docker.

5. The head-end system for terrestrial broadcast based on a virtualized broadcast framework of claim 4, wherein the worker node sets a parameter of a scheduler for transmission of the ATSC 3.0 terrestrial broadcast, calculates a transmission bandwidth of the scheduler, adds a broadcast service to a corresponding transmission bandwidth, determines whether the transmission bandwidth is greater than a maximum bandwidth, and then automatically setting a maximum setting available value of a service depending on an allocated physical bandwidth by stopping addition of the broadcast service when the transmission bandwidth is greater than the maximum bandwidth and further adding a broadcast service when the transmission bandwidth is not greater than the maximum bandwidth.

* * * * *